(12) United States Patent
Koike et al.

(10) Patent No.: US 6,583,403 B1
(45) Date of Patent: Jun. 24, 2003

(54) OBJECT DETECTING DEVICE, AND TRAVEL SAFETY SYSTEM FOR VEHICLE

(75) Inventors: Hiroyuki Koike, Saitama (JP); Kiichiro Sawamoto, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/695,135

(22) Filed: Oct. 25, 2000

(30) Foreign Application Priority Data

Oct. 26, 1999 (JP) .............................. 11-303406
May 18, 2000 (JP) ........................... 2000-146086

(51) Int. Cl.$^7$ .............................................. H01J 40/14
(52) U.S. Cl. ........................... 250/221; 342/70; 342/71; 342/72
(58) Field of Search ............................ 250/221; 342/70, 342/71, 72, 114; 280/734, 735; 180/232, 274

(56) References Cited

U.S. PATENT DOCUMENTS 5,598,164 A * 1/1997 Reppas et al. ................. 342/70
5,995,037 A * 11/1999 Matsuda et al. ............... 342/70
6,157,892 A * 12/2000 Hada et al. .................... 701/301
6,275,180 B1 * 8/2001 Dean et al. ................... 342/128

OTHER PUBLICATIONS

Japanese Patent Application Laid–Open No. 11–202049.*

* cited by examiner

Primary Examiner—Robert H. Kim
Assistant Examiner—Courtney Thomas
(74) Attorney, Agent, or Firm—Arent Fox Kintner Plotkin & Kahn

(57) ABSTRACT

Stationary objects are determined from objects detected by a radar device mounted on a vehicle. Objects detected with a dispersion in the level of the reception of a reflected wave at a relative distance in a range of 20 m to 100 m that is equal to or smaller than a first threshold value, are extracted from the extracted objects, and objects existing on a predicted course for the vehicle is extracted from the extracted objects. Further, it is determined if one of the extracted objects detected with rate of decrease in level of reception at a relative distance in a range of 10 m to 20 m is equal to or larger than a second threshold value and with a level of reception equal to or smaller than a third threshold value is an object which provides no hindrance even if the vehicle passes over the object. A warning or an automatic braking is discontinued or moderated based on the type of object. Thus, it is possible to precisely determine whether the object detected by the radar device mounted on the vehicle is an object particularly providing no hindrance even if the vehicle travels astride the object as it is, or whether it is an object the contact of the vehicle with which is required to be avoided, thereby carrying out a precise warning or automatic braking.

9 Claims, 7 Drawing Sheets

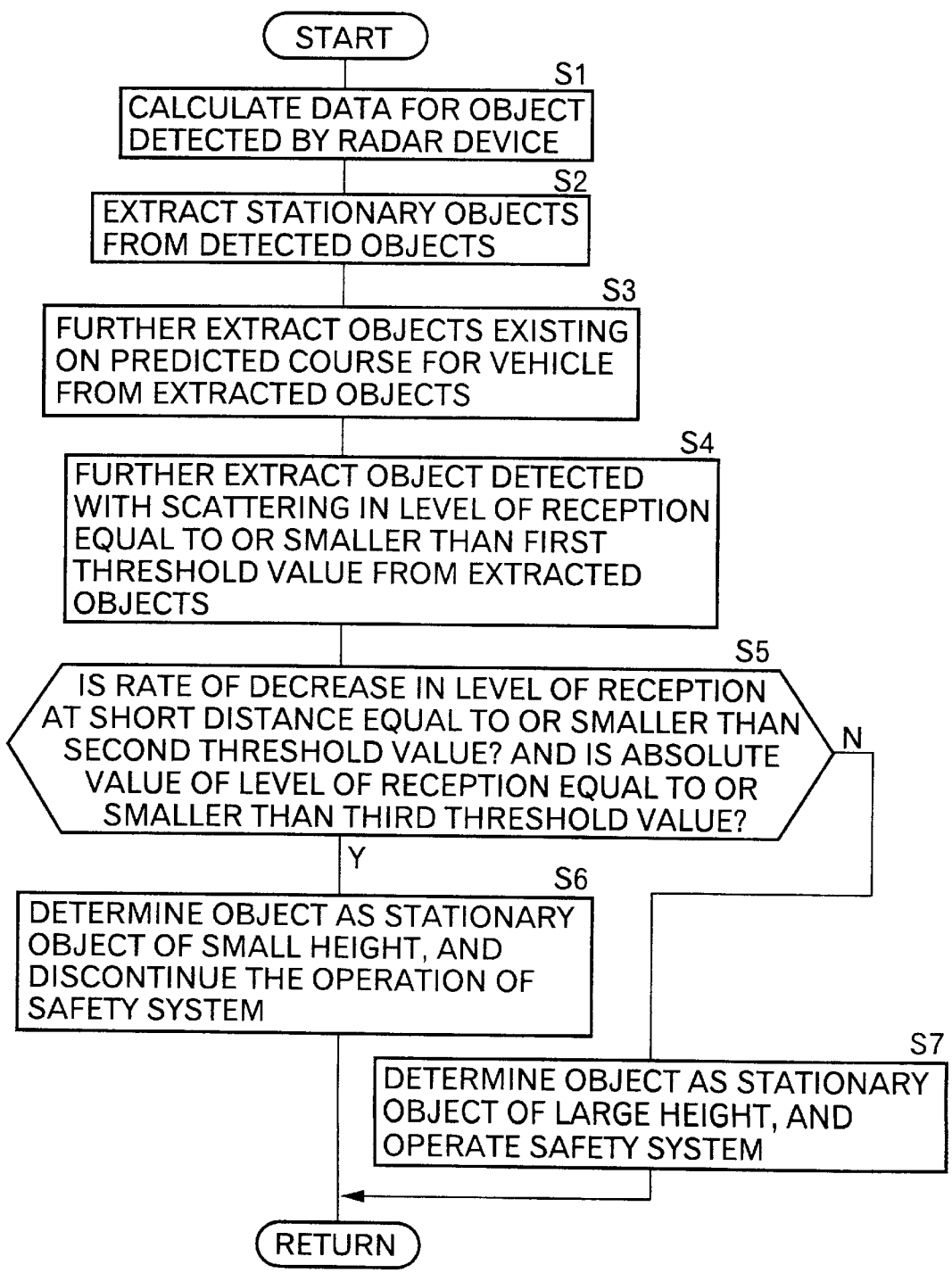

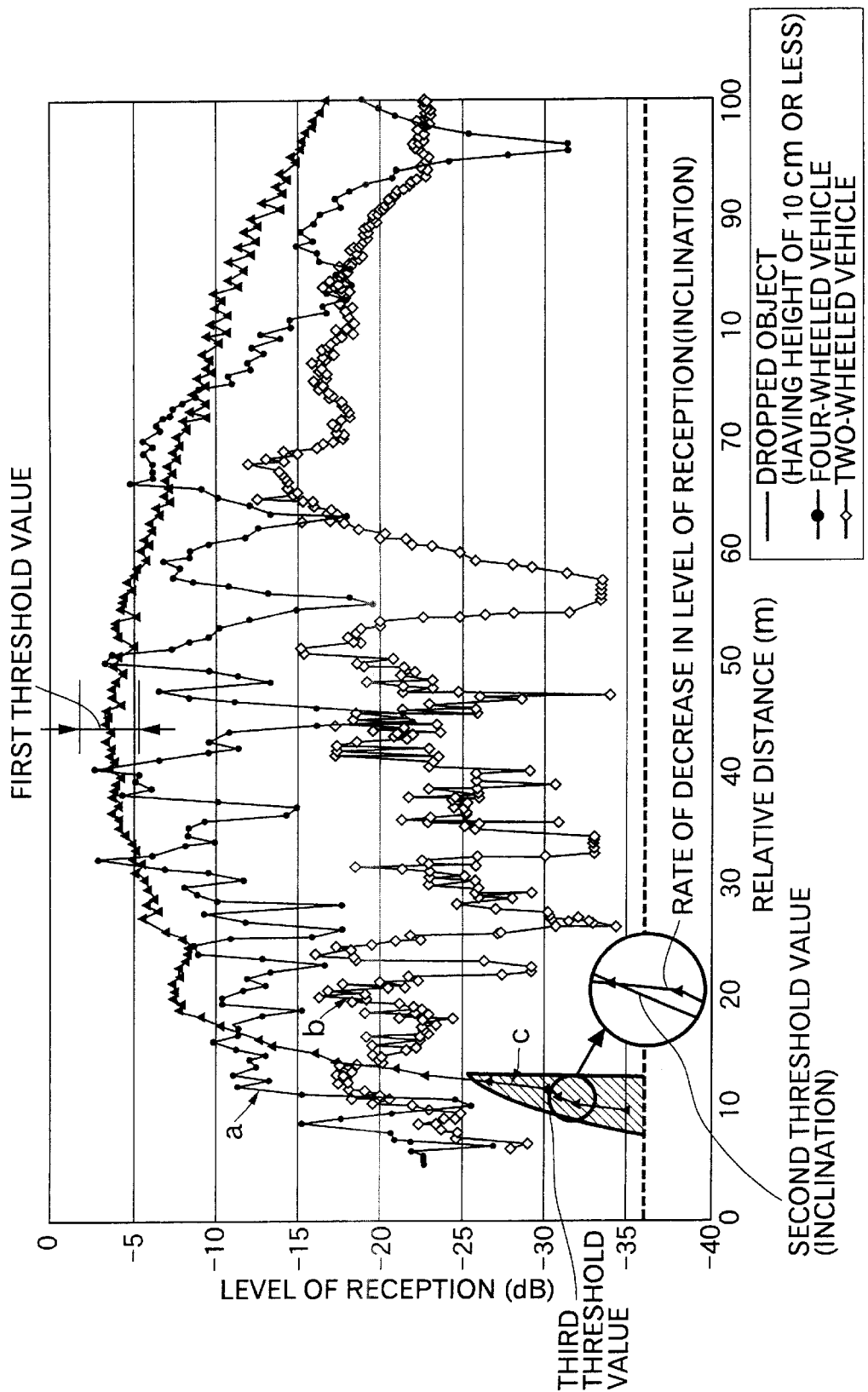

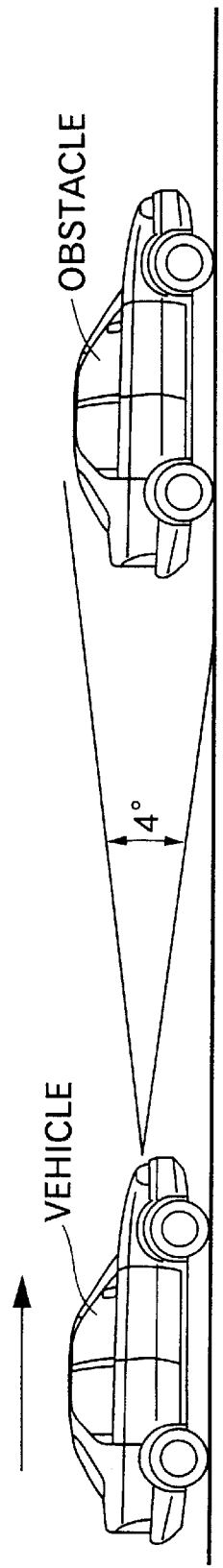
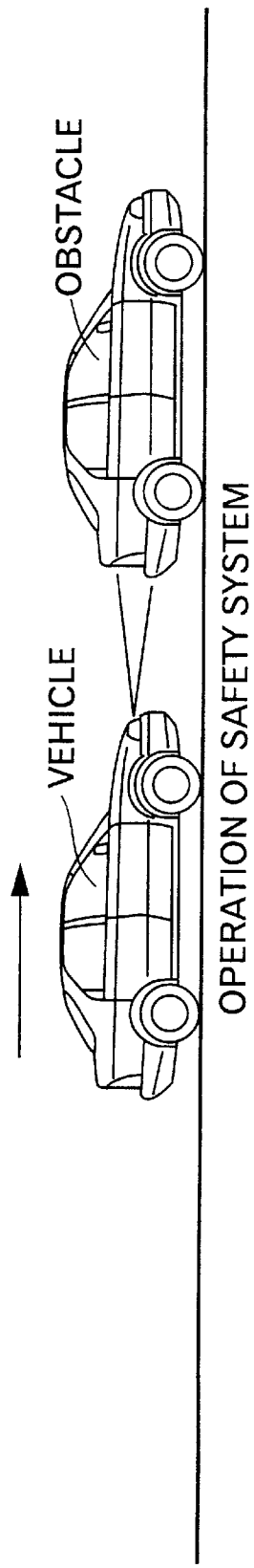

OBJECT DETECTING DEVICE, AND TRAVEL SAFETY SYSTEM FOR VEHICLE

BACKGROUND OF THE INVENTION

1. Field of the Invention

The present invention relates to an object detecting device for detecting an object ahead of a vehicle in the direction of its movement. This detection is based on the reception of a reflected wave, resulting from the reflection from the object, of an electric wave transmitted ahead of the vehicle. The invention is also directed to a travel safety system for a vehicle, including such an object detecting device.

2. Description of the Related Art

There is a travel safety system known from Japanese Patent Application Laid-open No. 11-202049, wherein a radar device mounted on a subject vehicle detects a distance to an obstacle such as a vehicle traveling ahead of the subject vehicle, and a direction and a relative speed of the obstacle. When it is determined that there is a possibility of the contact of the subject vehicle with the obstacle, based on the distance, the direction and the relative speed, a warning is provided to a driver to instruct spontaneous braking or steering, or an automatically braking device is operated. Thus the subject vehicle can be prevented from coming into contact with the obstacle, or alleviating the damage due to the contact.

When a millimeter wave radar device is used, information on distances to a plurality of objects, directions and relative speeds of the objects can be obtained. If information on a vehicle speed of the subject vehicle is added to such information, an object with a speed relative to the subject vehicle that is equal to the vehicle speed of the subject vehicle can be recognized as a stationary object at rest on a road surface. Examples of such stationary objects include dropped objects on a road surface (such as an iron plate, a corrugated board, an opened can and the like) in addition to a footbridge and a signpost. For those of these dropped objects, which have a height of, for example, about 10 cm, there is no possibility that even if the vehicle travels astride the objects, the objects come into contact with a lower surface of the vehicle and hence, there is particularly not a hindrance.

With the known safety system, however, it is impossible to distinguish a stationary object such as a dropped object of a small height which provides no hindrance even if the vehicle passes over the object, from another large-sized stationary object the contact of the vehicle with which is required to be avoided. For to this reason, an unnecessary warning or an unnecessary automatic braking may be produced that provides difficulty for a driver in some cases.

SUMMARY OF THE INVENTION

Accordingly, it is an object of the present invention to ensure that it is possible to precisely determine whether an object detected by an object detecting means is an object which provides no hindrance even if the vehicle passes over the object, or as an object the contact of the vehicle with which is required to be avoided.

To achieve the above object, according to a first aspect and feature of the present invention, there is provided an object detecting device comprising a transmitting means for transmitting an electric wave in a direction of movement of a vehicle, a receiving means for receiving a reflected wave resulting from a reflection of the electric wave transmitted by the transmitting means from an object, and an object detecting means for detecting whether the object is on a course for the vehicle, based on a result of a reception provided by the receiving means, wherein the object detecting device further includes an obstacle determining means for determining whether the object detected by the object detecting means is an obstacle which provides a hindrance to the movement of the vehicle.

With the above arrangement, when the object detecting means detects the object based on the result of the reception of the reflected wave resulting from the reflection from the object of the electric wave transmitted in the direction of movement of the vehicle, the obstacle determining means determines whether the object is an obstacle which provides a hindrance to the movement of the vehicle. Therefore, it is possible to precisely determine whether it is necessary to conduct an operation for avoiding contact of the vehicle with the object, or whether the vehicle may pass over the object as it is.

According to a second aspect and feature of the present invention, the object detecting device further includes a motional state detecting means for detecting a motional state of the vehicle, and a stationary object determining means for determining whether the object detected by the object detecting means is a stationary object, based on the motional state of the vehicle detected by the motional state detecting means and the result of reception provided by the receiving means, and wherein the obstacle determining means determines whether the object determined as being the stationary object by the stationary object determining means is an obstacle.

With the above arrangement, it is determined whether the object is an obstacle, based on the motional state of the vehicle and the result of reception provided by the receiving means, and it is determined whether the object determined as being the stationary object is an obstacle. Therefore, the obstacle over which the vehicle cannot stride is excepted in advance, thereby simplifying the determination of whether the object is an obstacle which provides a hindrance to the movement of the vehicle.

According to a third aspect and feature of the present invention, the obstacle determining means determines that an object detected with a level of a signal received by the receiving means at a short distance being equal to or lower than a predetermined value is an object which provides no hindrance to the traveling of the vehicle.

With the above arrangement, the object detected with the level of the signal received by the receiving means at the short distance being equal to or lower than a predetermined value is determined as being the object which provides no hindrance to the traveling of the vehicle. Therefore, it is possible to precisely determine whether the object is an obstacle, in accordance with the level of the received signal.

The "short distance" is set to a distance in a range of about 10 m to about 20 m in an embodiment, but is not limited to a distance in such range in the present invention.

According to a fourth aspect and feature of the present invention, the obstacle determining means determines that an object detected with a rate of decrease in the level of a signal received at a short distance being equal to or higher than a predetermined value is an object which provides no hindrance to the traveling of the vehicle.

With the above arrangement, the object detected with the rate of decrease in the level of the signal received at the short distance being equal to or higher than the predetermined value is determined as being the object which provides no hindrance to the traveling of the vehicle. Therefore, it is possible to precisely determine whether the object is an obstacle, in accordance with the rate of decrease in the level of the received signal.

The "short distance" is set to a distance in the range of about 10 m to about 20 m in the embodiment, but is not limited to a distance in such range in the present invention.

According to a fifth aspect and feature of the present invention, the object detecting device further includes a scattering determining means for determining a scattering in the level of a signal received by the receiving means, and the obstacle determining means determines that an object detected with the scattering determined by the scattering determining means being equal to or smaller than a predetermined value is an object which provides no hindrance to the movement of the vehicle.

With the above arrangement, the object detected with the scattering determined by the scattering determining means being equal to or smaller than the predetermined value is determined as being the object which provides no hindrance to the movement of the vehicle. Therefore, it is possible to precisely determine whether the object is an obstacle, in accordance with the scattering in the level of the received signal.

According to a sixth aspect and feature of the present invention, the scattering determining means determines a scattering in the level of the signal received by the receiving means for an object spaced at a predetermined distance from the vehicle.

With the above arrangement, the scattering in the level of the signal received by the receiving means is determined for the object spaced at a predetermined distance from the vehicle. Therefore, the difference between the scatterings is remarkable depending on the height of an object, and it is possible to precisely determine an object that provides no hindrance to the traveling of the vehicle.

The "predetermined distance" is set in a range of 20 m to 100 m in the embodiment, but is not limited to a distance in such range in the present invention.

According to a seventh aspect and feature of the present invention, the scattering determining means determines a scattering in the signal received by the receiving means in a predetermined time.

With the above arrangement, the scattering in the signal received by the receiving means in the predetermined time is determined. Therefore, an influence such as a noise can be eliminated to accurately determine the scattering.

The "predetermined time" is set in a range of 0.5 seconds to 2.0 seconds in the embodiment, but is not limited to a time in such range in the present invention.

According to an eight aspect and feature of the present invention, there is provided a travel safety system for a vehicle, including an object detecting device having the first or second feature, wherein when there is a possibility of contact of the vehicle with an object detected by the object detecting device, the safety system mounted in the vehicle is operated to avoid the contact, wherein when the obstacle determining means determines that the object is an object which provides no hindrance to the movement of the vehicle, the operation of the safety system is discontinued or moderated.

With the above arrangement, when the detected object is the object which provides no hindrance to the movement of the vehicle, the operation of the safety system for avoiding the contact of the vehicle with the object is discontinued or moderated. Therefore, it is possible to avoid having a driver receive a sense of incompatibility due to an unnecessary operation of the safety system.

The above and other objects, features and advantages of the invention will become apparent from the following description of the preferred embodiment taken in conjunction with the accompanying drawings.

BRIEF DESCRIPTION OF THE DRAWINGS

FIGS. 1 to 7B show an embodiment of the present invention, wherein

FIG. 1 is an illustration of the entire arrangement of a vehicle including a travel safety system mounted thereon;

FIG. 2 is a diagram showing the arrangement of an automatically braking device;

FIG. 3 is a block diagram of a control system;

FIG. 4 is a flow chart for explaining the operation;

FIG. 5 is a graph showing a variation in level of reception of a reflected wave in accordance with a distance between the vehicle and each of objects;

FIGS. 6A and 6B are views for explaining the operation, when a four-wheeled vehicle as an obstacle has been detected; and FIGS. 7A and 7B are views for explaining the operation, when a small-sized dropped object which provides no hindrance, even if the vehicle strides over the object.

DESCRIPTION OF THE PREFERRED EMBODIMENT

The present invention will now be described by way of an embodiment with reference to the accompanying drawings.

Figure 1:
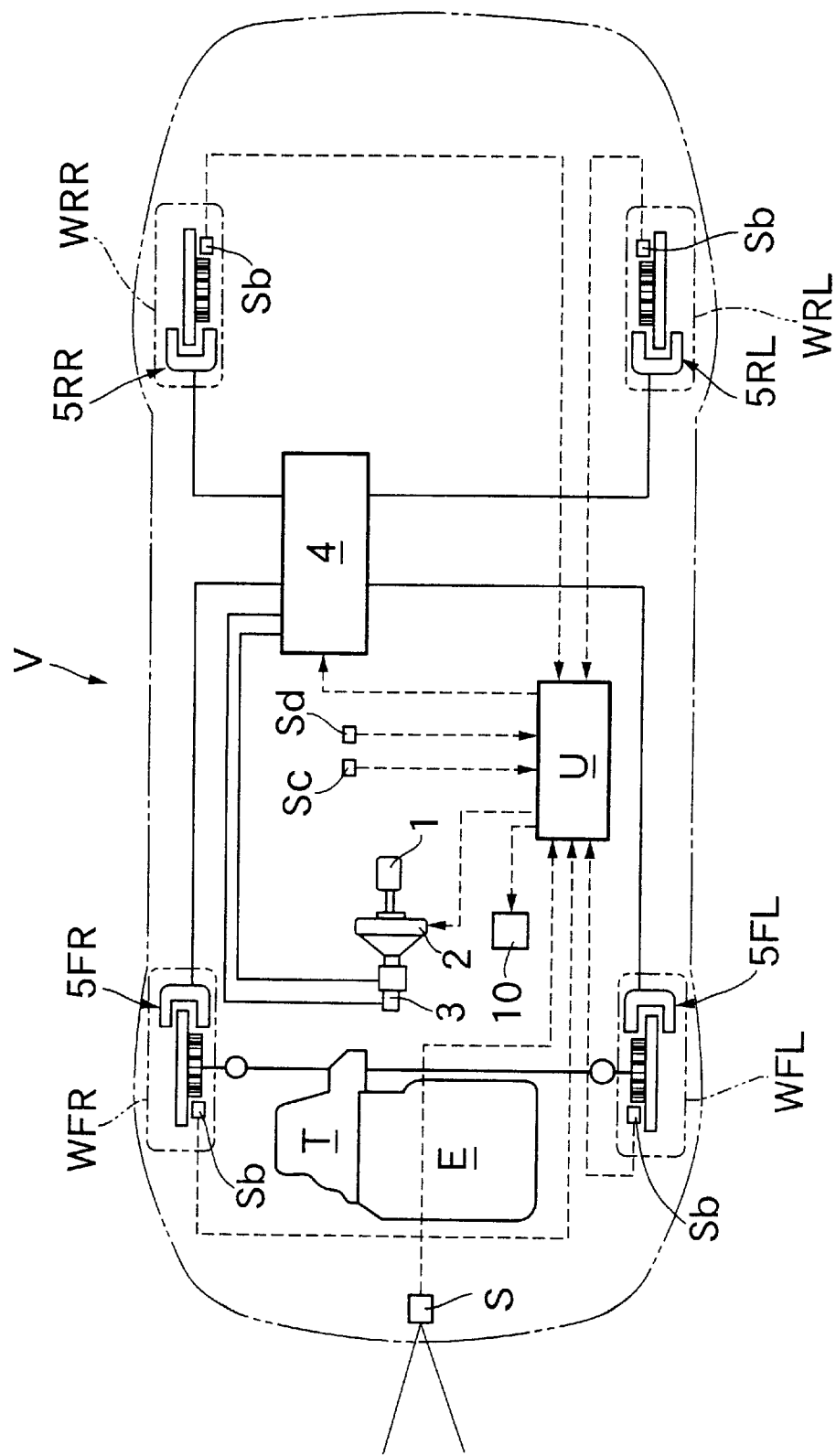
Figure 2:
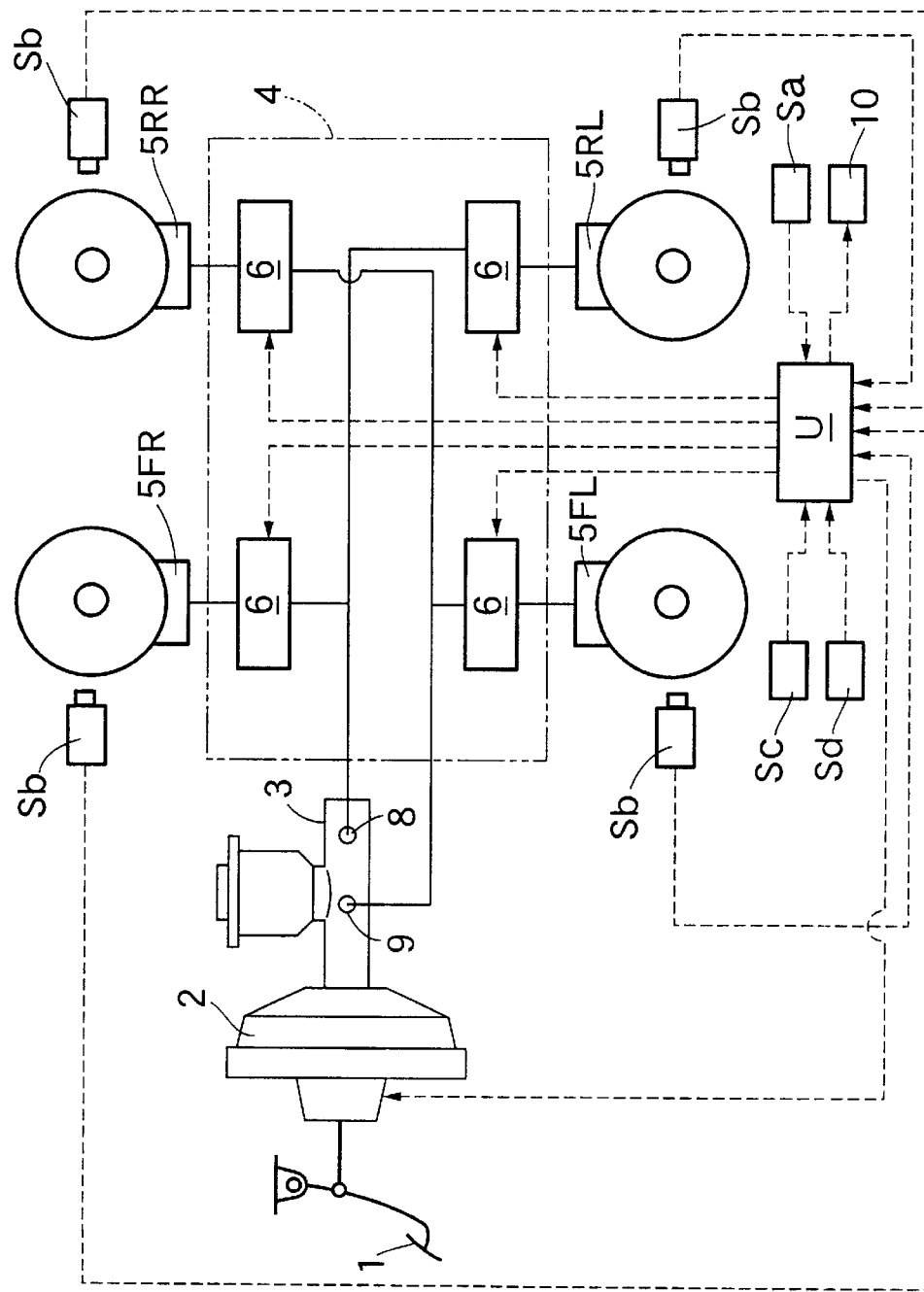

Referring to FIGS. 1 and 2, a four-wheeled vehicle V includes left and right front wheels WFL and WFR which are driven wheels and to which a driving force from an engine E is transmitted through a transmission T, and left and right rear wheels WRL and WRR which are follower wheels and which are rotated with traveling of the vehicle V. A brake pedal 1 operated by a driver is connected to a master cylinder 3 through an electronic control vacuum booster 2, which constitutes a safety device of the present invention. The electronic control vacuum booster 2 mechanically boosts the depression force on the brake pedal 1 to operate the master cylinder 3, and to operate the master cylinder 3 by a braking command signal from an electronic control unit U without recourse to the operation of the brake pedal during back-up of the braking. When a depression force has been applied to the brake pedal, and the braking command signal has been input from the electronic control unit U, the electronic control vacuum booster 2 outputs a braking hydraulic pressure in accordance with larger one of the depression force and the braking command signal. An input rod of the electronic control vacuum booster 2 is connected to the brake pedal 1 through a lost motion mechanism, so that even if the electronic control vacuum booster 2 is operated by the signal from the electronic control unit U, whereby the input rod is moved forwards, the brake pedal 1 remains at an initial position.

A pair of output ports 8 and 9 in the master cylinder 3 are connected to brake calipers 5FL, 5FR, 5RL and 5RR respectively mounted on the front wheels WFL and WFR and the rear wheels WRL and WRR through a hydraulic control device 4, which constitutes the safety device of the present invention The hydraulic control device 4 includes four pressure regulators 6 in correspondence to the four brake calipers 5FL, 5FR, 5RL and 5RR. The pressure regulators 6 are connected to the electronic control unit U to individually control the operations of the brake calipers 5FL, 5FR, 5RL and 5RR mounted on the front wheels WFL and WFR and the rear wheels WRL and WRR. Therefore, if the braking hydraulic pressures transmitted to the brake calipers 5FL, 5FR, 5RL and 5RR are controlled independently by the pressure regulators 6, an antilock brake control operation for controlling the locking of the wheels during braking of the vehicle can be carried out.

Connected to the electronic control unit U are a radar device Sa for transmitting a millimeter wave forwards of a vehicle body to detect a relative distance between the vehicle and an object, a relative speed between the vehicle and the object and a direction of the object with respect to the vehicle, based on a reflected wave resulting from the millimeter wave, wheel speed sensors Sb for detecting rotational speeds of the front wheels WFR and WFL and the rear wheels WRL and WRR, respectively, a yaw rate sensor Sc for detecting a yaw rate of the vehicle, and a steering angle sensor Sd for detecting a steering angle of a steering wheel. The wheel speed sensors Sb, the yaw rate sensor Sc and the steering angle sensor Sd constitute a motional state detecting means of the present invention.

The electronic control unit U controls the operations of the electronic control vacuum booster 2 and the hydraulic control device 4 as well as an alarm device 10 such as a speaker, a buzzer, a chime, a lamp and the like, which emits a warning to a driver, based on a signal from the radar device Sa and signals from the sensors Sb to Sd. The alarm device 10 constitutes the safety device of the present invention.

Figure 3:
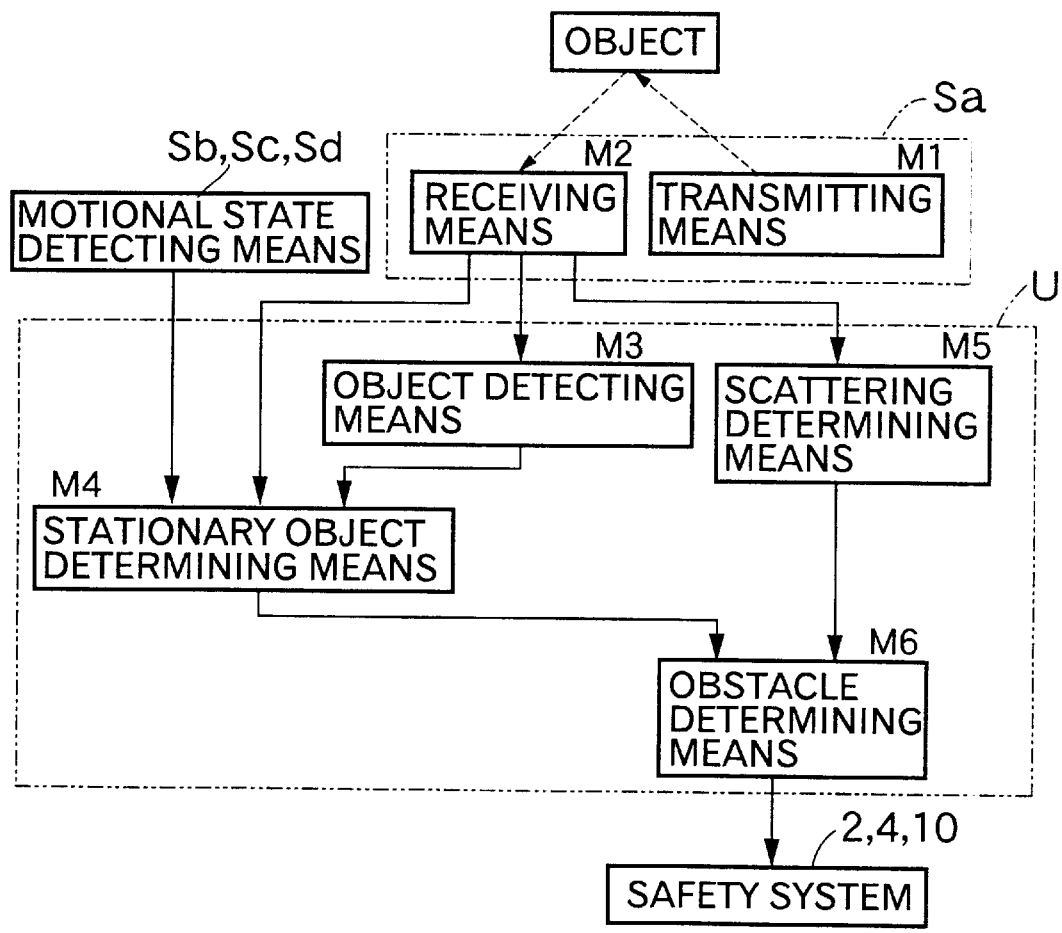

As shown in FIG. 3, the radar device Sa includes a transmitting means M1 for transmitting a millimeter wave forwards of the vehicle body, and a receiving means M2 for receiving a reflected wave resulting from the reflection of the millimeter wave from an object. The electronic control unit U includes an object detecting means M3, a stationary object determining means M4, a scattering determining means M5 and an obstacle determining means M6.

The outlines of the operations of the object detecting means M3, the stationary object determining means M4, the scattering determining means M5 and the obstacle determining means M6 of the electronic control unit U will be described below.

The object detecting means M3 detects a relative distance between the vehicle and an object, a relative speed between the vehicle and the object and a direction of the object with respect to the vehicle, based on a result of reception provided by the receiving means M2 of the radar device Sa. The stationary object determining means M4 distinguishes a stationary object from the objects detected by the object detecting means M3, namely, a footbridge, a signpost, a guardrail, a dripped object on a road or the like, and further determines whether such stationary object exists on a future predicted course for the vehicle. More specifically, when the relative speed detected between the vehicle and the object by the receiving means M2 is equal to the vehicle speed detected by the wheel speed sensors Sb, it is determined that the object is a stationary object on a road surface. The future predicted course for the vehicle is presumed based on the vehicle speed detected by the wheel speed sensors Sb, the yaw rate detected by the yaw rate sensor Sc and the steering angle detected by the steering angle sensor Sd, and it is determined whether the stationary object exists on the predicted course for the vehicle. The scattering determining means M5 determines that there is a possibility that an object detected with a small scattering in result of reception provided by the receiving means M2, namely, an object detected with a small dispersion in level of reception of the reflected wave may be an object of a small-height (e.g., an object having a height of about 10 cm) which provides no hindrance, even if the vehicle strides over such object as it is.

When the stationary object determining means M4 has determined the object as being a stationary object existing on the predicted course for the vehicle, and when the obstacle determining means M6 has determined that the object which is determined as being the object of the small height from the dispersion of the levels of reception of the reflected wave by the scattering determining means M5 is an object which provides no hindrance even if the vehicle strides over the object as it is, the operation of the safety device 2, 4 and 10 is discontinued or moderated by the obstacle determining means M6. In other words, usually, when an obstacle having a possibility of contact with the vehicle has been detected, the alarm device 10 is operated to urge the driver for an spontaneous braking, or the front wheels WFL and WFR and the rear wheels WRL and WRR are braked automatically through the electronic control vacuum booster 2 and the hydraulic control device 4 to avoid the contact or alleviate the damage due to the contact. In the case of the object which provides no hindrance even if the vehicle strides over the object as it is, however, the unnecessary operation of the safety device 2, 4 and 10 is avoided to prevent a sense of incompatibility felt by the driver.

The operation of the embodiment of the present invention will be described in detail with reference to a flow chart in FIG. 4 and a graph in FIG. 5.

First, at Step S1 of the flow chart shown in FIG. 4, a relative distance between the vehicle and an object, a relative speed between the vehicle and the object and a direction of the object with respect to the vehicle are detected, based on a result of reception provided by the receiving means M2 of the radar device Sa. At subsequent Step S2, an object or objects moving at a relative speed equal to the vehicle speed of the vehicle are extracted as stationary objects from the objects detected at Step S1. At Step S3, an object existing on a future predicted course for the vehicle is further extracted from the objects extracted at Step S2, based on the vehicle speed, the yaw rate and the steering angle of the vehicle. At this time, in place of presuming the future predicted course for the vehicle based on the vehicle speed, the yaw rate and the steering angle of the vehicle, the future predicted course for the vehicle can be presumed based on a white line on a road detected by a shooting means such as a CCD camera.

At next Step S4, an object detected with a scattering (e.g., dispersion) in level of reception equal to or smaller than a first threshold value and at a relative distance to the vehicle in a range of 20 m to 100 m is extracted as an object having a possibility that it is a stationary object of a small height. The detection of the object by the radar device Sa is conducted at a period of 100 m sec, and thus, several runs of the detection are conducted, while the relative distance is being decreased. However, to enhance the reliability of the determination of whether the object is an object which provides no hindrance even if the vehicle strides over the object as it is, it is ensured that when the scattering in level of reception exceeds the first threshold value, predetermined times or more (e.g., one time), the object is prevented from being determined as being an object which provides no hindrance even if the vehicle strides over the object as it is, and further, the object detected with a scattering in level of reception equal to or smaller than the first threshold value and at a relative distance in a range of 20 m to 100 m is extracted as an object having a possibility that it is a stationary object of a small height.

The graph in FIG. 5 shows results of measurement of level of reception of the reflected wave in accordance with the distance from the vehicle for three types of objects: a small-sized dropped object (having a height of 10 cm), a four-wheeled vehicle and two-wheeled vehicle. When the relative distance is in a range of 20 m to 100 m, the scattering in level of reception of the reflected wave for the four-wheeled vehicle and the two-wheeled vehicle, is large, but the scattering in level of reception of the reflected wave for the small-sized dropped object is extremely small. The reason is as follows: for the tall four-wheeled vehicle and two-wheeled vehicle, the scattering is large, because the reflected wave includes, in addition to a reflected wave resulting from the direct reflection from the vehicle body, a secondary reflected wave (a multipulse) resulting from the wave reflected from the vehicle body being further reflected from a road surface. On the other hand, for the small-sized dropped object of the small height, the scattering is small, because the secondary reflected wave is little included in the reflected wave.

The determination of the scattering in level of reception is carried out over a predetermined time (e.g., in a range of 0.5 seconds to 2.0 seconds) in order to eliminate an influence such as a noise and the like. However, when the vehicle speed of the vehicle is larger, the speed of approaching the object is larger and hence, the predetermined time can be shortened so as to achieve the prompt determination.

At subsequent Step S5, an object which provides no hindrance even if the vehicle strides over the object as it is, is extracted from the objects extracted at Step S4 and having a possibility that they are stationary objects of small heights. The determination of such object is carried out by comparing a rate of decrease in level of reception at the time when the relative distance to the vehicle has reached a range corresponding to about 10 m, with a second threshold value, and comparing the level of reception with a third threshold value.

The constant threshold value shown by a broken line in FIG. 5 is such a threshold value that when the level of reception is equal to or smaller than such threshold value, the presence itself of the object cannot be determined. When the relative distance between the vehicle and the object is in the range of about 10 m, the third threshold value in the present invention suddenly rises from the constant threshold value up to about −21 dB at a peak value (see obliquely-lined region). When the rate (see FIG. 5) of decrease in level of reception for the object extracted at Step S4 and having the possibility that it is the stationary object of the small height is equal to or larger than the second threshold value and the level of reception for such object is equal to or smaller than the third threshold value, it is determined at Step S6 that such object is a small-sized stationary object which provides not hindrance even if the vehicle strides over such object, and the operation of the safety device 2, 4 and 10 is discontinued or moderated.

Figure 7A:
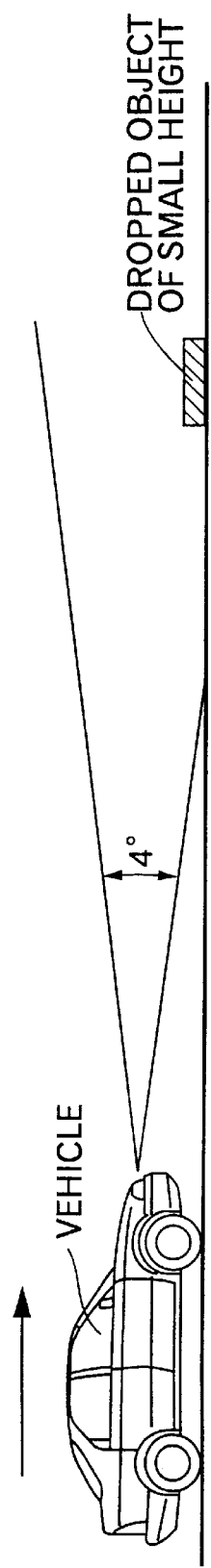
Figure 7B:
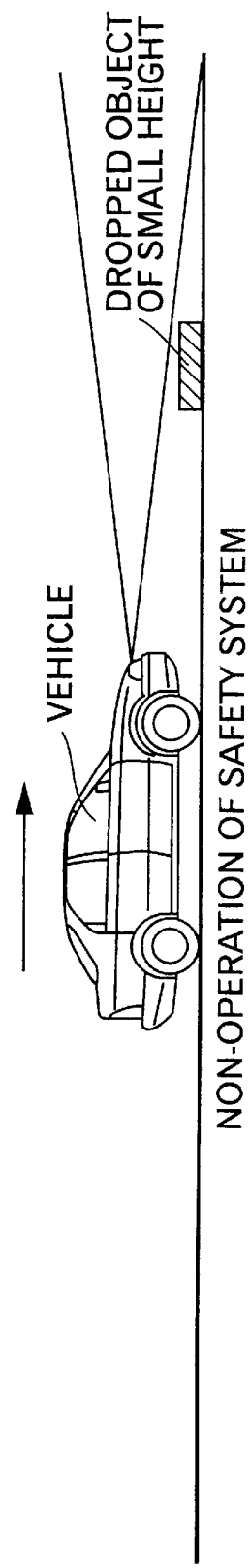

The reason why it is possible to determine whether the object is the small-sized stationary object of the small height at Step S5 is as follows: The radar device Sa transmits a millimeter wave into a detection area spreading vertically at 4°. When the vehicle is approaching a large-sized object such as a four-wheeled vehicle and a two-wheeled vehicle (see FIG. 6A), the vehicle body of the object cannot be fallen out of the detection area and hence, the level of reception cannot be decreased suddenly (see a portion indicated by a and a portion indicated by b in FIG. 5 and see FIG. 6B). In the case of a small-sized dropped object of a small height (see FIG. 7A), however, when the vehicle has been moved to a location where a relative distance from the object is about 10 m to 20 m, the object is fallen quickly out of the detection area and hence, the level of reception is decreased suddenly (see a portion indicated by C in FIG. 5 and see FIG. 7). Therefore, it is possible to determine that an object satisfying the conditions at Step S5 is a small-sized stationary object of a small height, which provides no hindrance even if the vehicle strides over the object as it is.

When it is determined in the above manner that the detected object is the small-sized stationary object of the small height, the warning or the automatic deceleration, if it has already been carried out, is discontinued immediately at Step S6. It should be noted that the warning or the automatic braking can be moderated in place of being discontinued. More specifically, various modes are considered such as the switchover of the automatic braking to the warning, the reduction in deceleration in the automatic braking, the reduction in sound volume of the warning and the like.

On the other hand, when the rate of decrease in level of reception for the object extracted at Step S4 exceeds the second threshold value, or the level of reception is smaller than the third threshold value at Step S5 in an area where the relative distance between the vehicle and the object is near 10 m, it is determined at Step S7 that the object is not a small-sized stationary object of a small height, and the operation for the warning or the automatic braking is permitted. This operation includes the switchover of the warning to the automatic braking, and the switchover of the automatic braking providing a low deceleration to the automatic braking providing a high deceleration.

In short, it is determined that the object satisfying the following conditions (1), (2) and (3) is a small-sized dropped object of a small height, which provides no hindrance even if the vehicle strides the object as it is.

(1) The scattering in level of reception is equal to or smaller than the first threshold to value in an area where the relative distance between the vehicle and the object is in a range of about 20 m to about 100 m.

(2) The rate of decrease in level of reception is equal to or larger than the second threshold value in an area where the relative distance between the vehicle and the object is in a range of about 10 m to about 20 m.

(3) The rate of decrease in level of reception is equal to or smaller than the third threshold value in the area where the relative distance between the vehicle and the object is in the range of about 10 m to about 20 m.

It is also possible to determine that an object satisfying at least one of the conditions (1), (2) and (3) is a small-sized dropped object of a small height, which provides no hindrance even if the vehicle passes over the object as it is.

The electronic control vacuum booster 2 and the hydraulic control device 4 have been illustrated as the safety device for automatically decelerating the vehicle in the embodiment. Alternatively, an automatically closing device for a throttle valve or an automatically shutting-down device for the transmission can be employed as a safety device. In addition, the distance for determining the scattering in level of reception of the reflected wave has been set in the range of 20 m to 100 m in the embodiment, but it is of course that the distance can be set in any proper range.

Although the embodiment of the present invention has been described in detail, it will be understood that the present invention is not limited to the above-described embodiment, and various modifications in design may be made without departing from the spirit and scope of the invention defined in claims.

What is claimed is:

1. An object detecting device comprising:

transmitting means for transmitting an electric wave in a direction of movement of a vehicle;

receiving means for receiving a reflected wave resulting from a reflection by an object of the electric wave transmitted by said transmitting means; and object detecting means for detecting whether said object is on a course for the vehicle, based on a result of a reception provided by said receiving means, wherein said object detecting device further includes an obstacle determining means for determining whether the object detected by said object detecting means as being on said course is an obstacle which provides a hindrance to the traveling of the vehicle or which does not provide such a hindrance thereby permitting the vehicle to stride over and pass said object.

2. An object detecting device according to claim 1, further comprising a motional state detecting means for detecting a motional state of the vehicle, and a stationary object determining means for determining whether the object detected by said object detecting means is a stationary object, based on the motional state of the vehicle detected by said motional state detecting means and the result of the reception provided by said receiving means, and wherein said obstacle determining means determines whether the object determined as being the stationary object by said stationary object determining means is said obstacle that hinders the movement of the vehicle.

3. An object detecting device according to claim 1 or 2, wherein said obstacle determining means determines that said object detected with a level of a signal received by said receiving means at a short distance with said level of said signal being equal to or lower than a predetermined value provides no hindrance to the movement of the vehicle.

4. An object detecting device according to claim 1 or 2, wherein said obstacle determining means determines that said object detected with a rate of decrease in a level of a signal received by said receiving means at a short distance with said rate of decrease in said level of said signal being equal to or higher than a predetermined value provides no hindrance to the movement of the vehicle.

5. An object detecting device according to claim 1 or 2, further comprising a scattering determining means for determining a scattering in a level of a signal received by said receiving means, and wherein said obstacle determining means determines that said object detected with said scattering determined by said scattering determining means that is equal to or smaller than a predetermined value provides no hindrance to the movement of the vehicle.

6. An object detecting device according to claim 5, wherein said scattering determining means determines said scattering in the level of the signal received by said receiving means for said object spaced at a predetermined distance from the vehicle.

7. An object detecting device according to claim 5, wherein said scattering determining means determines said scattering in the signal received by said receiving means in a predetermined time.

8. A travel safety system for a vehicle, comprising an object detecting device according to claim 1, wherein where there is a possibility of contact of the vehicle with said object detected by said object detecting device, said safety system mounted in the vehicle is operated to avoid the contact when said obstacle determining means determines that the object is said obstacle which hinders the movement of the vehicle.

9. A travel safety system for a vehicle, according to claim 8, wherein when said object is not said obstacle which hinders the movement of the vehicle, the operation of said safety system is discontinued or moderated.

* * * * *